United States Patent [19]
Olson

[11] 3,857,407
[45] Dec. 31, 1974

[54] PRESSURE REGULATOR

[76] Inventor: Donald O. Olson, 5885 Darmouth St., Chula Vista, Calif. 92010

[22] Filed: Sept. 24, 1973

[21] Appl. No.: 399,844

[52] U.S. Cl. .......................... 137/495, 137/505.41
[51] Int. Cl. ............................................ F16k 31/14
[58] Field of Search ...................... 137/495, 505.18

[56] References Cited
UNITED STATES PATENTS

| | | | |
|---|---|---|---|
| 1,897,517 | 2/1933 | Hughes | 137/495 |
| 2,111,560 | 3/1938 | Fox | 137/495 |
| 2,853,268 | 9/1958 | Hughes | 137/909.18 X |
| 2,938,539 | 5/1960 | Holmes | 137/495 X |
| 2,941,543 | 6/1960 | Kleczek | 137/505.18 |
| 2,941,543 | 1/1963 | Eichelman | 137/505.18 |
| 3,071,147 | 1/1963 | Dudzinski | 137/495 X |
| 3,387,622 | 6/1968 | Weinstein | 137/495 |

*Primary Examiner*—Harold W. Weakley
*Attorney, Agent, or Firm*—Owen, Wickersham & Erickson

[57] ABSTRACT

A pressure regulator has a movable valve element which is positioned in response to the inlet and the outlet pressure of fluid flowing through the regulator and a variable spring force as determined by the calibration setting. A shut-off arrangement is incorporated in the pressure regulator for enabling the valve to be closed and opened without affecting the calibration setting.

2 Claims, 5 Drawing Figures

PATENTED DEC 31 1974 3,857,407
SHEET 1 OF 2
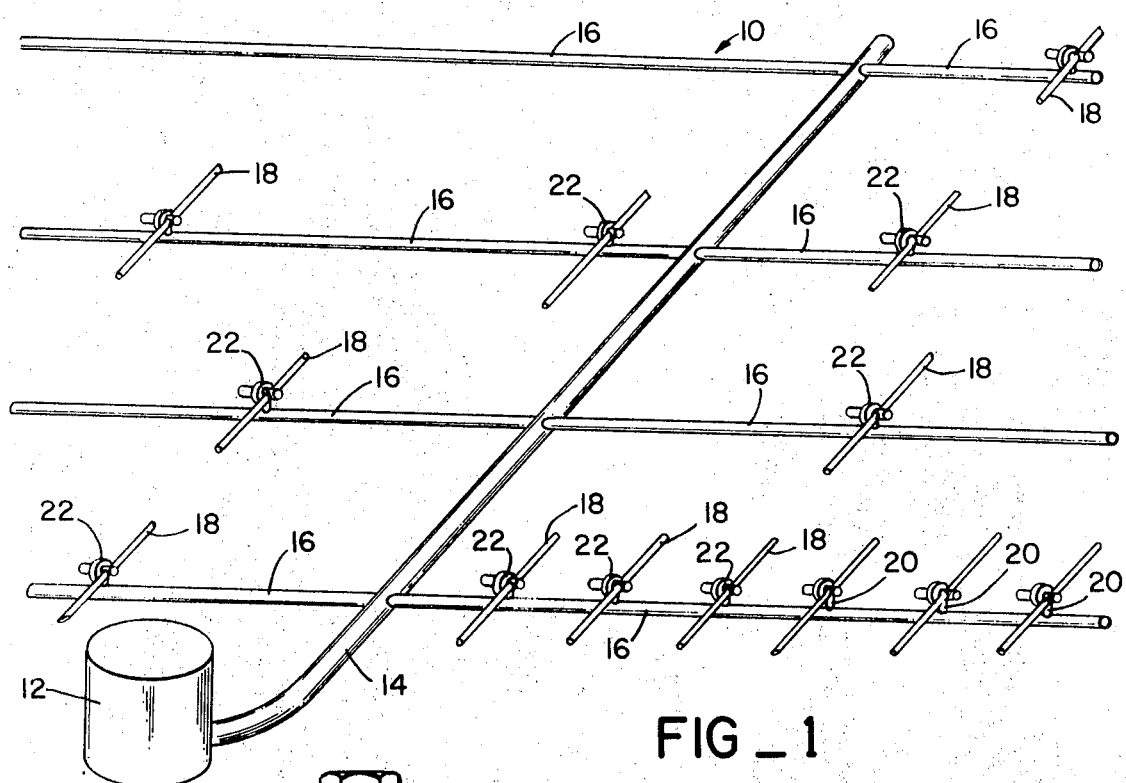
FIG_1
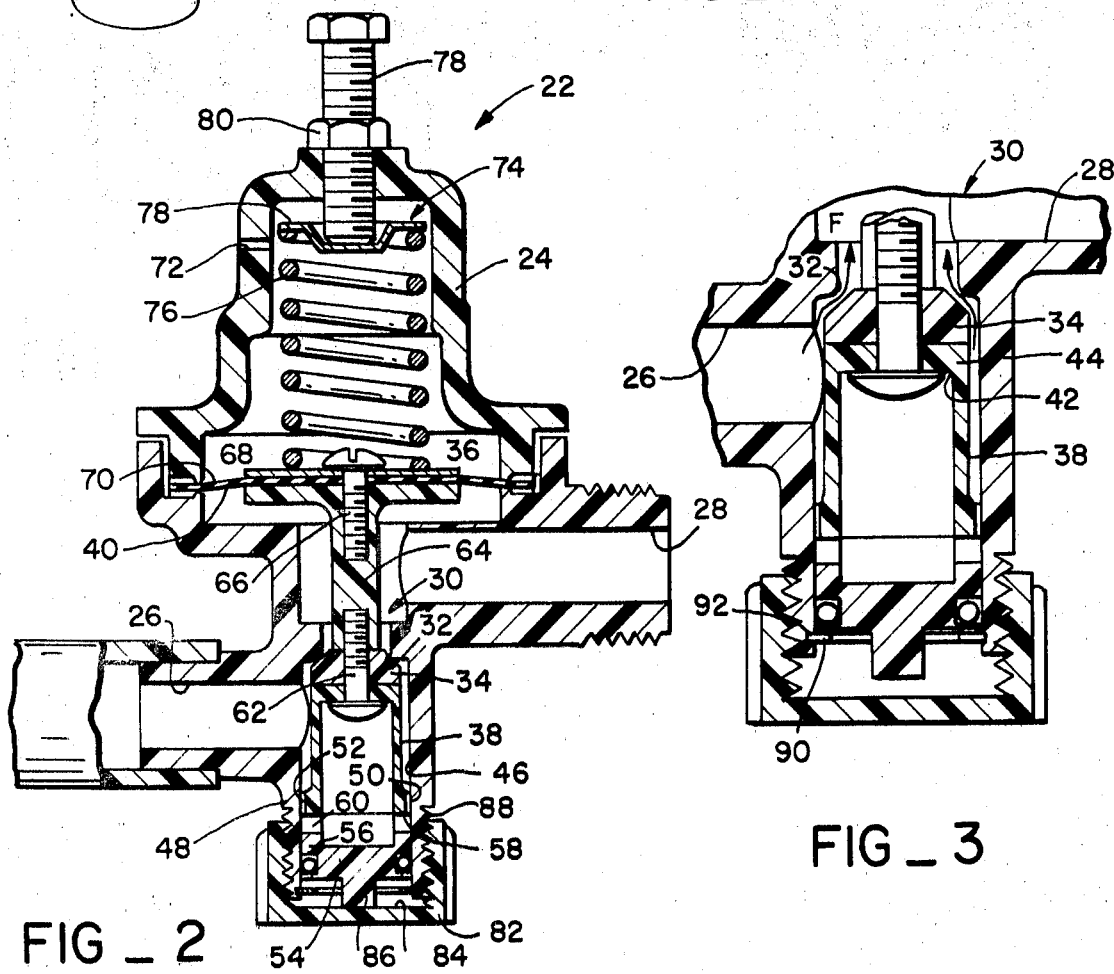
FIG_2
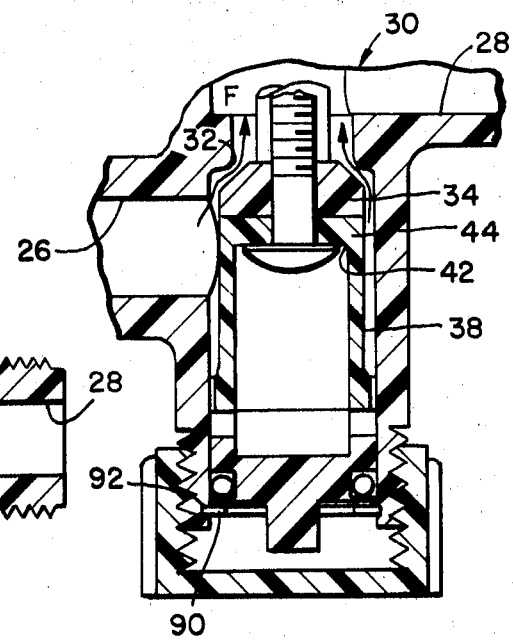
FIG_3

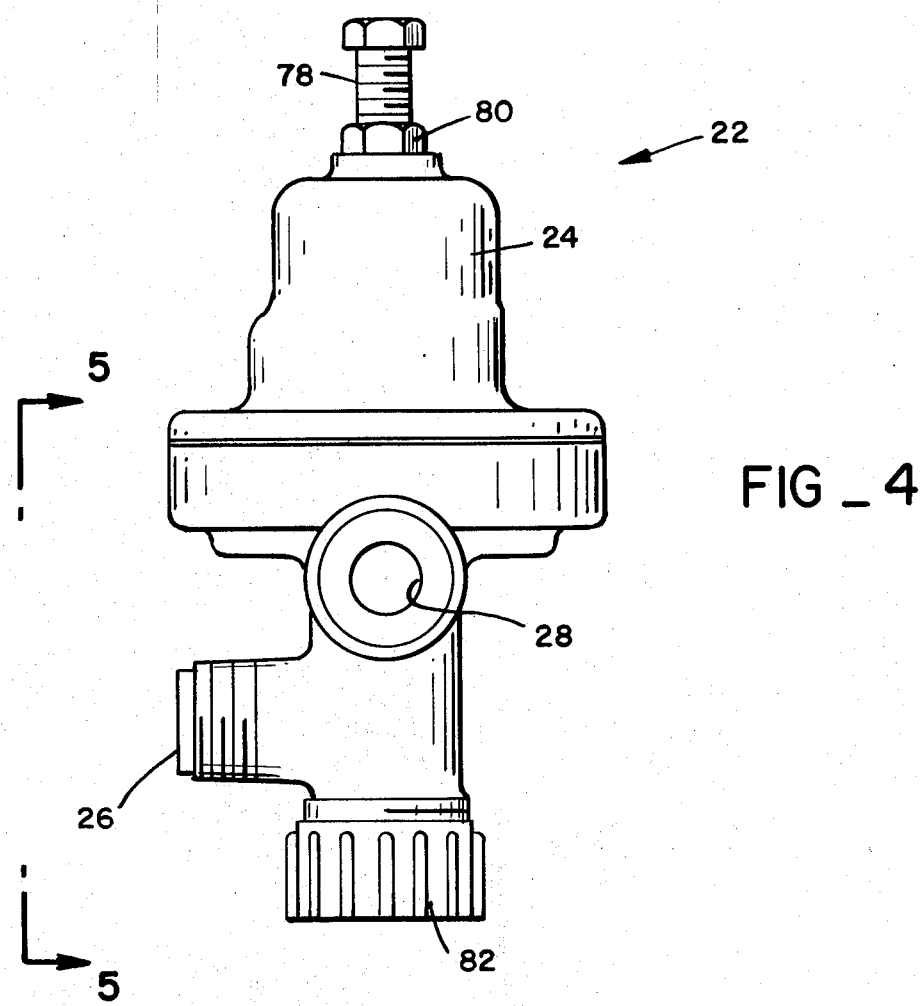
FIG_4
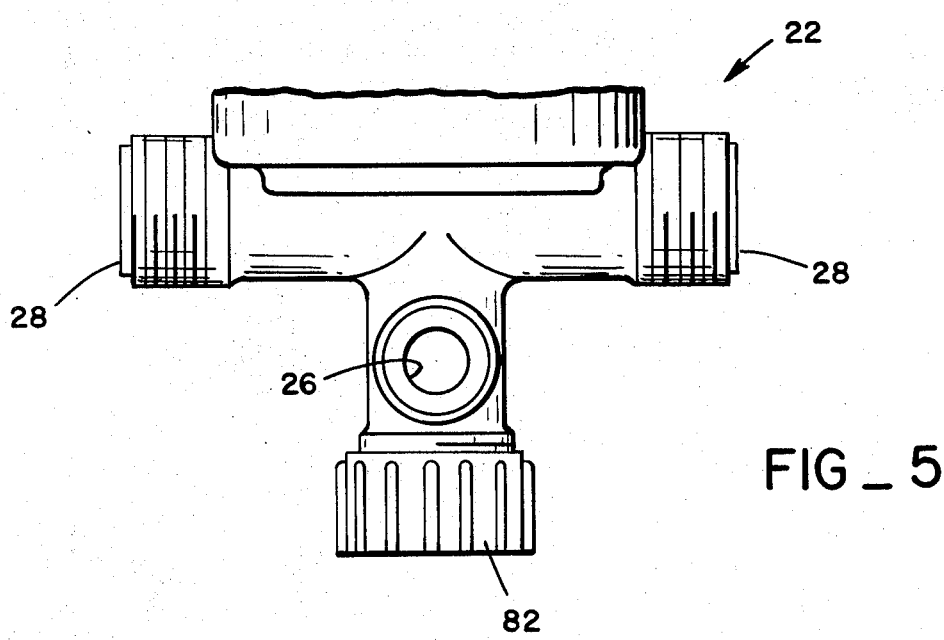
FIG_5

PRESSURE REGULATOR

BACKGROUND OF THE INVENTION

This invention relates to a pressure regulator. It relates particularly to a pressure regulator for an irrigation system of the kind in which individual drip lines operating at relatively low pressure are connected through lateral lines to a main line operating at high pressure.

In irrigation systems of this kind a large number of pressure regulators are required. Each individual regulator should have a relatively simple construction to keep the expense as low as possible. The regulators should be capable of operating effectively after an initial calibration without the need to make continued adjustments. The regulators should also be rugged enough to operate in the field for long periods of time without maintenance.

The irrigation system is used only during certain periods of the year, and it is shut off at other times. To be fully satisfactory for use in such irrigation systems the pressure regulator must be capable of being shut off and opened, perhaps at some time several months after it has been shut off, without affecting the calibration setting.

SUMMARY OF THE INVENTION

It is a primary object of the present invention to construct a pressure regulator which fully meets all of the requirements noted above for a pressure regulator used in an irrigation system.

The pressure regulator of the present invention comprises an outer housing having an inlet connection for admitting fluid at a relatively high inlet pressure and one or more outlet connections for the outlet of fluid at a relatively low regulated pressure. The housing has a valve seat and a movable valve element for controlling the fluid flow between the inlet and outlet. Pressure responsive means, in the form of a flexible diaphragm and a movable piston are connected to the valve element to position the valve element in response to the inlet and outlet pressures. One side of the diaphragm is exposed to the outlet pressure, and the piston is exposed to the inlet pressure. The area of the diaphragm is considerably larger than the area of the piston to provide the desired amount of mechanical advantage. For calibrating the outlet pressure, a spring is connected to the valve element, and a screw applies a selected amount of biasing force. In the normal operation of the pressure regulator the spring setting acts in association with the diaphragm and piston to determine the outlet pressure.

The piston is mounted for movement within a cylinder formed in a boss on the housing and has an extension part which extends outward beyond the end of the boss. A cap is threaded on the outside of the boss. It can be turned down to seat the valve element or unscrewed to permit the valve element to move off of the valve seat in response to the action of the diaphragm, piston and spring. In this latter condition of operation, retaining means within the boss (a snap ring in a specific form of the invention) limit the extent of outward movement of the piston and movement of the valve element away from the valve seat. This restraint on the valve element movement is operative primarily during start-up of flow through the pressure regulator following a period in which the pressure regulator has been shut off. After the flow through the regulator stabilizes, the retaining means are normally not operative.

Pressure regulator apparatus and methods which incorporate the structure and techniques described above and which are effective to function as described above constitute specific objects of this invention.

Other objects, advantages and features of my invention will become apparent from the following detailed description of one preferred embodiment taken with the accompanying drawings.

BRIEF DESCRIPTION OF THE DRAWINGS

FIG. 1 is an isometric view of an irrigation system incorporating pressure regulators constructed in accordance with the present invention;

FIG. 2 is an elevation view in cross-section of a pressure regulator constructed in accordance with one embodiment of the present invention and showing the valve element closed against the valve seat;

FIG. 3 is an enlarged fragmentary view like FIG. 2 but showing the valve element off of the valve seat with the parts of the regulator in the operative positions assumed during normal fluid flow through the pressure regulator;

FIG. 4 is an elevation view of a pressure regulator constructed in accordance with a second embodiment of the present invention and having a cross for the outlet connections; and FIG. 5 is an end elevation view of the lower half of the pressure regulator shown in FIG. 4 and taken along the line and in the direction indicated by the arrows 5—5 in FIG. 4.

DESCRIPTION OF THE PREFERRED EMBODIMENTS

An irrigation system incorporating pressure regulators constructed in accordance with one embodiment of the present invention is indicated generally by the reference numeral 10 in FIG. 1.

The system 10 includes a storage tank 12 and a main line 14. The main line 14 is a relatively large diameter line, often 10 inches in diameter, and it extends for a considerable distance from the supply tank. A pump, not illustrated in the drawings, pressurizes the fluid in the main line to a relatively high pressure.

A plurality of lateral lines 16 are connected to the main line 14. In a typical system the lateral lines may be spaced about 600 feet apart and may extend for about 800 feet on each side of the main line 14.

A plurality of drip lines 18 are connected to each lateral line 16 through risers 20. In a typical system, the main line 14 and lateral lines 16 are disposed some distance beneath the surface and the risers are used to connect each lateral to the drip lines on or just below the surface. The drip lines 18 may be spaced about 20 feet apart.

Each drip line 18 has a series of emitters connected to the drip line at spaced locations for permitting a controlled drip type flow to the area around the emitter. A typical emitter used for this purpose is shown in my U.S. Pat. No. 3,693,657 issued Sept. 26, 1972. The emitters operate at a considerably lower pressure than that existing in the main line 14.

Each riser therefore has a pressure regulator 22 constructed in accordance with an embodiment of the present invention.

As illustrated in FIG. 2 the pressure regulator 22 includes a housing 24 having an inlet 26 which is connected to the riser 20 and an outlet 28 which is connected to a drip line 18.

The flow between the inlet 26 and the outlet 28 is controlled by a valve 30. The valve 30 has a valve seat 32 and a movable element 34.

In FIG. 2, the valve element 34 is shown seated against the valve seat 32 in the closed position of the valve.

FIG. 3 shows the valve element 34 off of the valve seat 32 in the open, operative position of the valve. In this operative position the flow lines F indicate the fluid flow between the inlet 26 and the outlet 28.

The pressure regulator 22 includes pressure responsive means for controlling the fluid flow through the valve 30 to regulate the pressure in the outlet 28. These pressure responsive means include a flexible diaphragm 36 and a piston 38. The flexible diaphragm 36 has a lower surface 40 which is exposed to the fluid pressure in the outlet 28. The piston 38 has a surface 42 which is exposed to the pressure in the inlet 26 as will be described in greater detail below.

As illustrated in FIGS. 2 and 3 the piston 38 is a tubular piston, and the surface 42 is formed on the interior of an end wall 44 of the piston.

The piston 38 is mounted for reciprocation in a cylindrical bore 46 of a boss 48 on the housing 24. The lower end (as viewed in FIGS. 2 and 3) of the piston 38 has an enlarged diameter part having an outer surface 50 which engages and slides on the sidewall of the bore 46. A number of vertically extending slots 52 are formed in this outer periphery so that fluid can flow freely from the inlet 26 through the space between the piston 38 and the bore 46 and through the slots 52.

A part 54 is also mounted in the bore 46 and has an upwardly extending rim 56 which engages the bottom edge 58 of the piston 38 in the disposition of the parts shown in FIG. 2. The upwardly extending rim 56 has a plurality of laterally extending slots 60 which connect with the slots 52 for transmitting fluid from the slots 52 through the slots 60 and into the interior of the piston 38, where the pressure acts on the surface 42. The inlet pressure acting on the surface 42 thus tends to move the valve element 34 upwardly toward engagement with the valve seat 32.

A cap screw 62 connects the piston 38 to the valve element 34. This cap screw 62 also connects the valve element 34 to a part 64 which is in turn connected to the diaphragm 36 by a second cap screw 66 and a clamping plate 68.

The interior of the housing 24 and the upper surface 70 of the diaphragm 36 are exposed to ambient air pressure by an opening 72 which extends through the housing 24.

The pressure regulator 22 includes calibrating means for applying a selected amount of a biasing force to the valve element 34. These calibrating means are indicated generally by the reference numeral 74 in FIG. 2 and include a spring 76 and an adjustment screw 78. One end of the spring 76 engages the top of the clamping plate 68 and the other end of the spring engages a spring retainer 78. The adjusting screw 78 is threaded within the top of the housing 24 and bears against the top of the spring retainer plate 78. A locking nut 80 locks the adjustment screw 78 in the desired position. The adjustment screw 78 thus provides a selected amount of biasing force which tends to move the valve element 34 away from the valve seat 32 against the forces developed by the pressure responsive means acting on the under surface 40 of the flexible diaphragm 36 and the inner surface 42.

The pressure regulator 22 also includes means for shutting off the flow of fluid to the regulator without changing the effective biasing force of the calibration means 74. These shut-off means include an end cap 82 which is threaded on the outside of the boss 48. The inside surface 84 of the end cap is engageable with a center projection 86 of the part 54 when the end cap is turned down on the threads 88 of the boss 48 as illustrated in FIG. 2. In this disposition of the parts, the part 54 moves the piston 38 and valve element 34 upward until the valve element 34 engages the valve seat 32 to shut off flow through the regulator.

When the end cap 82 is turned outward on the threads 88, the valve element 34 moves off of the valve seat 32 to permit fluid to start flowing through the regulator 22. As the end cap is rotated outwardly far enough on the threads 88, the surface 84 completely disengages from the center projection 86 and the valve element 34 regulates fluid flow in accordance with the calibration setting previously set by the screw 78.

The pressure regulator 22 also includes retainer means for limiting the extent to which the spring 76 can move the valve element away from the valve seat. In a specific form of the present invention these retainer means include a snap ring 90 seated in a groove 92 in the bore 46. These retaining means permit the cap 82 to be completely removed without risking loss of the piston 38 due to an excessive spring bias or pressure fluctuations in the lateral line 16 or riser 20.

FIGS. 4 and 5 show a second embodiment of a pressure regulator 22 constructed in accordance with the present invention. The pressure regulator shown in FIGS. 4 and 5 is like that shown in FIGS. 2 and 3 except that the outlet is a cross or T-connection to provide two outlets rather than the single outlet shown in FIGS. 2 and 3.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pressure regulator of the kind used in irrigation systems for shutting off the flow through the regulator without changing the effective biasing force which regulates the pressure output, said pressure regulator comprising, a housing, an inlet for fluid at a high inlet pressure, an outlet for fluid at a lower, regulated outlet pressure, valve means including a valve seat and a movable valve element for controlling the fluid flow between the inlet and outlet, pressure responsive means responsive to the inlet and outlet pressures for positioning the valve element, said pressure responsive means including a piston connected to the movable valve element and having a surface exposed to the inlet pressure and a diaphragm connected to the movable valve element and having one surface exposed to the outlet pressure, adjustable calibration means associated with the pressure responsive means for applying a selected amount of a biasing force to the diaphragm and valve element, said adjustable calibration means including a spring engaged with the diaphragm on the side opposite the side exposed to the inlet pressure and a screw for varying the force exerted by the spring on the diaphragm and movable valve element, a cylindrical boss extending outward of the housing, a cylinder in the boss mounting the piston for reciprocation therein, retaining means for limiting outward movement of the piston under the biasing force exerted by said spring in the full open position of the valve means, an extension formed integrally with the piston and dimensioned to extend outward beyond the end of the boss when the piston is engaged with the snap ring, and a cap threaded on the end of the boss and engageable with said extension to move the valve element into engagement with the valve seat against the bias of the spring when the cap is turned down on the boss and also rotatable outward on the boss to a position in which the cap is disengaged from the extension as the piston engages the retaining means whereby the cap can be used to close and to open the pressure regulator to fluid flow without changing the effective biasing force set by the screw on the spring.

2. The invention defined in claim 1 wherein the retaining means is a snap ring seated in a groove in the cylinder.

* * * * *